United States Patent
Bulko et al.

(10) Patent No.: US 9,384,011 B2
(45) Date of Patent: Jul. 5, 2016

(54) WORKSPACE CREATION AND MANAGEMENT FOR A COMPUTING DESKTOP

(75) Inventors: William C. Bulko, Austin, TX (US);
Glenn D. Johnson, Austin, TX (US);
David B. Kumhyr, Austin, TX (US);
Jacobo A. Vargas, Austin, TX (US);
Yvonne M. Young, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 489 days.

(21) Appl. No.: 12/828,248

(22) Filed: Jun. 30, 2010

(65) Prior Publication Data
US 2012/0005692 A1    Jan. 5, 2012

(51) Int. Cl.
*G06F 3/048* (2013.01)
*G06F 9/44* (2006.01)
*G06F 9/445* (2006.01)

(52) U.S. Cl.
CPC .......... *G06F 9/4443* (2013.01); *G06F 9/44505* (2013.01)

(58) Field of Classification Search
CPC ............................ G06F 9/4443; G06F 9/44505
USPC ........................................... 715/765; 719/328
See application file for complete search history.

(56) References Cited

U.S. PATENT DOCUMENTS

| | | | | |
|---|---|---|---|---|
| 5,544,302 A * | 8/1996 | Nguyen | ................ | G06F 9/4443 715/781 |
| 5,874,958 A * | 2/1999 | Ludolph | ................ | G06F 9/4443 715/781 |
| 6,275,790 B1 | 8/2001 | Yamamoto | | |
| 6,567,973 B1 | 5/2003 | Yamamoto | | |
| 2007/0157115 A1* | 7/2007 | Peters | ................. | G06F 3/04817 715/808 |
| 2008/0172628 A1* | 7/2008 | Mehrotra | .......... | G06F 17/30997 715/771 |
| 2008/0244444 A1* | 10/2008 | Bauman | ................ | G06F 9/4443 715/806 |
| 2010/0180210 A1* | 7/2010 | Toyama | ................. | G06F 3/038 715/750 |

* cited by examiner

*Primary Examiner* — Anil Bhargava
(74) *Attorney, Agent, or Firm* — Steven M. Greenberg, Esq.; CRGO Law

(57) ABSTRACT

A method for managing a user interface desktop workspace is provided. The method includes selecting applications in a desktop environment rendered in memory of a computer. The method also includes querying each of the selection applications, capturing through the querying, attributes for each of the selected applications and writing references to the selected applications and corresponding ones of the captured attributes to a workspace profile. The method further includes generating a workspace object from the workspace profile. Finally, the method includes configuring the workspace object in the desktop environment to respond to activation by loading each of the applications in the workspace profile using the corresponding ones of the captured attributes in the workspace profile.

9 Claims, 2 Drawing Sheets

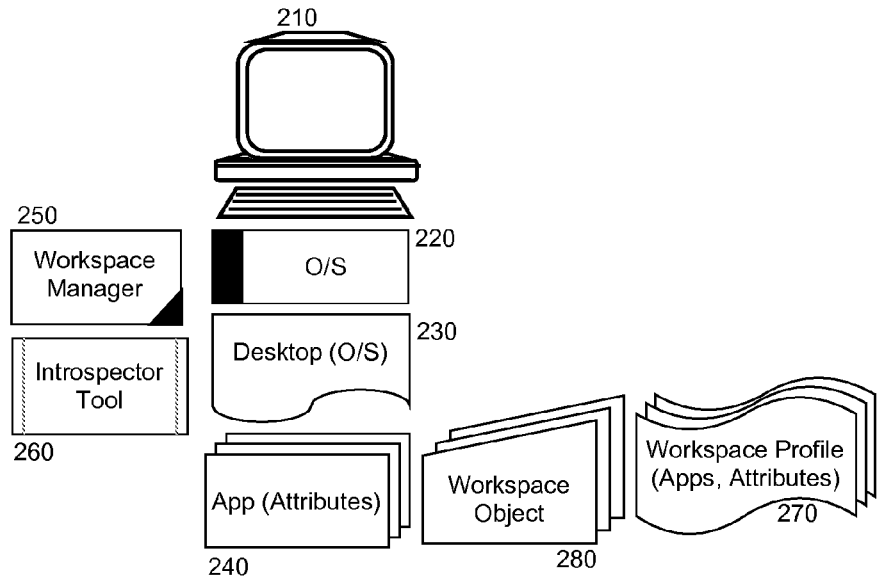
FIG. 2
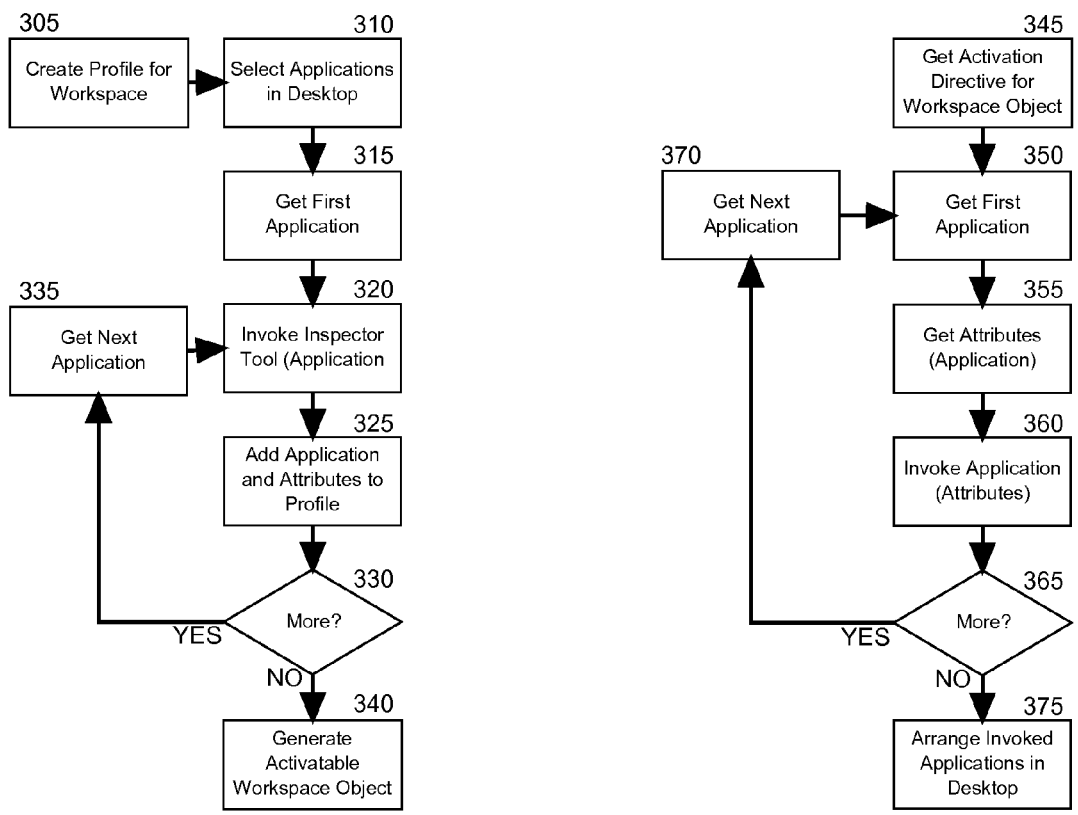
FIG. 3A
FIG. 3B

WORKSPACE CREATION AND MANAGEMENT FOR A COMPUTING DESKTOP

BACKGROUND OF THE INVENTION

1. Field of the Invention

The present invention relates to user interface desktop management and more particularly to grouping related application icons into a workspace in a desktop of a user interface.

2. Description of the Related Art

The computer desktop implements a familiar workspace paradigm for the end user interacting with the user interface of a computing application. Specifically, the computer desktop mimics the familiar top surface of a desk in which different files and documents can be placed and organized, along with ordinary tools of computing. Long part and parcel of the graphical user interface (GUI) of the conventional operating system, the desktop is the single mostly widely recognized user interface in computing today.

The icon forms part and parcel of the desktop. The icon generally is a graphical widget logically associated with an underlying document or application. Activation of the icon results in the loading of the logically associated document in a corresponding application, or the launching of a logically associated application. Each icon can include not only a logical association with an underlying document, but also each icon can include a reference to one or more parameters to be passed to the application upon launching. As it will be understood by the skilled artisan, different icons can be grouped together in a folder and the folder, itself, can be represented by an icon. In this way, the desktop can achieve a high degree of organization at the discretion of the end user.

In performing work through a desktop environment, end users repeatedly use the same collection of applications and documents. Manually launching each application and document in the collection at startup can be tedious and wasteful. Recognizing this problem, advanced operating systems provide for pre-determined desktop workspaces in which only a select group of applications are displayed. These advanced operating systems even permit the cycling of display of different "spaces", each with its own collection of applications. However, managing the content of a "space" can be labor intensive—particularly if the content of a space is ad hoc in nature and undocumented.

Work area folders provide a similar effect. In a work area folder, different applications and documents are grouped together as in the case of a work space. The activation of the work area folder results in the launching of each application and document in the work area folder. Conversely, the closing or hiding of the work area folder results in the closing or hiding as the case may be of each application or document in the work area folder. Even still, the work area folder also can require labor intensive management in both the creation and maintenance of the content of a work area folder.

BRIEF SUMMARY OF THE INVENTION

Embodiments of the present invention address deficiencies of the art in respect to desktop management and provide a novel and non-obvious method, system and computer program product for managing a user interface desktop workspace. In an embodiment of the invention, a method for managing a user interface desktop workspace is provided. The method includes selecting applications in a desktop environment rendered in memory of a computer. The method also includes querying each of the selection applications, capturing through the querying, attributes for each of the selected applications and writing references to the selected applications and corresponding ones of the captured attributes to a workspace profile. The method further includes generating a workspace object from the workspace profile. Finally, the method includes configuring the workspace object in the desktop environment to respond to activation by loading each of the applications in the workspace profile using the corresponding ones of the captured attributes in the workspace profile.

In one aspect of the embodiment, selecting applications in a desktop environment rendered in memory of a computer includes selecting at least one application icon in a desktop environment rendered in memory of a computer, and at least one document icon loaded by an associated application in the desktop environment. In another aspect of the embodiment, the method includes hiding each of the applications in the desktop environment responsive to a directive to hide the workspace object in the desktop environment. In yet another aspect of the embodiment, the method includes closing each of the applications in the desktop environment responsive to a directive to close the workspace object in the desktop environment. In this regard, the workspace profile can be updated with changes to the attributes responsive to the directive to close the workspace object in the desktop environment.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein:

FIG. 2 is a schematic illustration of a data processing system configured for managing a user interface desktop workspace; and, FIGS. 3A and 3B, taken together, are a flow chart illustrating a process for managing a user interface desktop workspace.

DETAILED DESCRIPTION OF THE INVENTION

Figure 1:
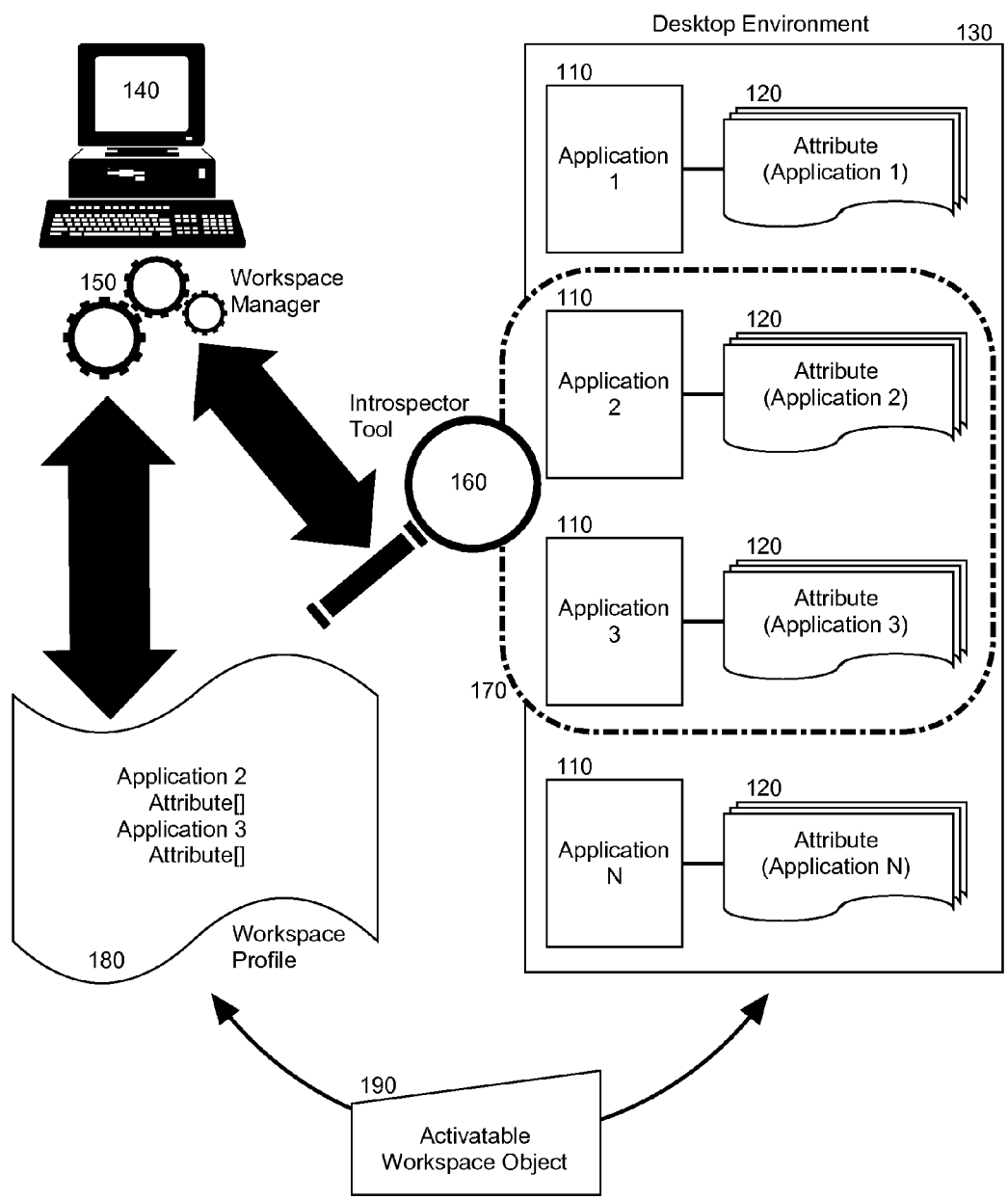
FIG. 1 is a pictorial illustration of a process for managing a user interface desktop workspace.

Embodiments of the invention provide for a method, data processing system and computer program product for managing a user interface desktop workspace. In accordance with an embodiment of the invention, different icons in a desktop environment of an operating system executing in memory of a computer can be grouped into a workspace, for instance by way of mouse selection. The icons individually can reference an application directly, or indirectly by way of a document loaded into the application. An inspector tool also executing in the memory of the computer can analyze a configuration of each application and a profile can be generated for the selection of icons in the workspace including the configuration for each underlying application. An icon can be created for the workspace referencing the profile. Responsive to the activation of the icon created for the workspace, each application can be launched with a configuration set forth in the profile. Thereafter, changes to the configuration of each application in the profile can be captured by the inspector tool. Subsequently, the profile can be modified to reflect the captured changes. In this way, managing the icons in the workspace can be facilitated.

In further illustration, FIG. 1 pictorially depicts a process for managing a user interface desktop workspace. As shown in FIG. 1, a desktop environment 130 can be provided in a user interface of computer 140, for example in a user interface for an operating system of the computer 140. The desktop environment 130 can include icons each referencing an application 110, either directly or indirectly through reference to a document loadable in the application 110. Each application 110 can include one or more attributes 120, such as display attributes for displaying the application 110 in a particular way in the desktop environment 130, or a particular set of parameters configuring the operation of the application 110.

A set of the applications 110 can be grouped into a selection 170 in the desktop environment 130. For example, the set of applications 110 can be grouped into a selection 170 through the operation of a mouse pointer. Subsequently, an introspector tool 160 can inspect and capture the attributes 120 for each selected one of the applications 110 in the selection 170. Thereafter, the introspector tool 160 can pass the captured ones of the attributes 120 to a workspace manager 150 executing in the computer 140 for reduction into a workspace profile 180 for the selection 170. The workspace profile 180 can include a listing of applications 110 in the selection 170 as well as corresponding ones of the attributes 120. The workspace profile 180 in turn can be used to generate an activatable workspace object 190 for placement in the desktop environment 130 as an icon. The activation of the activatable workspace object 190 can be processed by the workspace manager 150 that can parse the workspace profile 180 to launch listed ones of applications 110 with corresponding ones of the attributes 120.

The presentation of the launched ones of the applications 110 can be managed according to the activatable workspace object 190. The hiding of the activatable workspace object can result in the hiding of each of the applications 110 launched as a result of activating the activatable workspace object 190. Similarly, the closing of the activatable workspace object 190 can result in the closing of each of the applications 110 launched as a result of activating the activatable workspace object 190. To the extent any of the attributes 120 of any of the applications 110 launched as a result of activating the activatable workspace object 190 has changed, the changes to the attributes 120 can be applied to the workspace profile 180 for the activatable object 190, for instance at the discretion of the end user. Similarly, removed ones or added ones of the applications 110 can be added to the workspace profile 180 at the discretion of the end user.

The process described in connection with FIG. 1 can be implemented in a data processing system. In this regard, FIG. 2 is a schematic illustration of a data processing system configured for managing a user interface desktop workspace. The system can include a computer 210 with at least one processor and memory. The computer 210 can include an operating system 220 executing in the memory by at least one of the processors and can provide a desktop environment 230 as a user interface to the operating system 220. The desktop environment 230 can include different applications 240, each with corresponding attributes and each activatable through the activation of an activatable icon.

A workspace manager 250 can be coupled to the operating system 220 along with an introspector tool 260. The workspace manager 250 can be enabled to respond to the selection of different icons in the desktop environment 230 representative of different applications 240 and the direction to create a workspace object 280, by invoking introspector tool 260 to capture the attributes of each of the selected applications 240. The workspace manager 250 further can be enable to write a listing of the applications 240 in the selection to a workspace profile 270 that in turn can be used to generate a workspace object 280 activatable in the desktop environment 230. Even yet further, the workspace manager 250 can be configured to manage the content of the workspace profile 270 as the attributes for applications 240 listed in the workspace profile 270, or the applications 240 themselves change.

In even yet further illustration of the operation of the workspace manager 250, FIGS. 3A and 3B, taken together, are a flow chart illustrating a process for managing a user interface desktop workspace. Beginning in block 305 of FIG. 3A, a profile can be created for a workspace in a desktop environment, and in block 310, different applications accessible through the desktop environment can be selected for inclusion in the workspace. In block 315, a first of the applications can be selected for processing an in block 320, the inspector tool can be invoked to capture the attributes of the selected application. In block 325, the captured attributes can be written to the workspace profile along with a reference to the application itself. In decision block 330, if additional applications remain to be processed for the selection, in block 335 a next application can be selected for processing and the process can continue through block 320 with the invocation of the inspector tool for the next application. In decision block 330, when no further applications remain to be processed for the selection, in block 340 an activatable workspace object can be generated for the workspace profile.

Turning now to FIG. 3B, once deployed, an activatable workspace object placed in the desktop environment can be activated to recall each application set forth in the corresponding workspace profile with any corresponding attributes specified in the workspace profile. In particular, in block 345, an activation directive can be received for a workspace object in the desktop environment. In block 350, a first application specified in a corresponding workspace profile can be retrieved and any attributes specified for the first application in the workspace profile can be loaded into memory block 355. In block 360, the first application can be invoked using the loaded attributes. Thereafter, in decision block 365 if additional applications remain to be processed in the workspace profile, in block 370 a next specified application in the workspace profile can be retrieved and the process can continue in block 355. When no additional applications referenced in the workspace profile remain to be processed in decision block 365, in block 375 the invoked applications can be arranged as set forth in the workspace profile and the process can end.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, radiofrequency, and the like, or any suitable combination of the foregoing. Computer program code for carrying out operations for aspects of the present invention may be written in any combination of one or more programming languages, including an object oriented programming language and conventional procedural programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described above with reference to flowchart illustrations and/or block diagrams of methods, apparatus (systems) and computer program products according to embodiments of the invention. In this regard, the flowchart and block diagrams in the Figures illustrate the architecture, functionality, and operation of possible implementations of systems, methods and computer program products according to various embodiments of the present invention. For instance, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It also will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Finally, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims as follows:

We claim:

1. A method for creating and managing user interface desktop workspaces, the method comprising:
    creating a plurality of user interface desktop workspaces, each user interface desktop workspace being created by
        selecting a multiplicity of application icons each of the icons referring to a corresponding application, in a desktop environment rendered in memory of a computer;
        querying each corresponding application of the icons and capturing through the querying, attributes for each application;
        creating a workspace profile and writing to the workspace profile a reference for each application corresponding to a selected one of the application icons and corresponding ones of the captured attributes; and
        generating a single activatable workspace object from the workspace profile for all of the selected multiplicity of application icons; and,
    upon activation of the single activatable workspace object, loading each of the applications in the workspace profile using for each of the applications, the corresponding ones of the captured attributes referenced in the workspace profile and modifying the workspace profile to reflect changes to the captured attributes.

2. The method of claim 1, further comprising:
    hiding each of the applications in the desktop environment responsive to a directive to hide the workspace object in the desktop environment.

3. The method of claim 1, further comprising:
    closing each of the applications in the desktop environment responsive to a directive to close the workspace object in the desktop environment.

4. The method of claim 3, further comprising:
    updating the workspace profile with changes to the attributes responsive to the directive to close the workspace object in the desktop environment.

5. A data processing system configured for creating and managing user interface desktop workspaces, the system comprising:
    a computer with at least one processor and memory;
    a desktop environment loaded in the memory of the computer and rendered in a display of the computer;
    an introspection tool executing in the computer; and,
    a workspace manager executing in the memory of the computer, the workspace manager comprising program code enabled to perform:
        creating a plurality of user interface desktop workspaces, each user interface desktop workspace being created by
            selecting a multiplicity of application icons each of the icons referring to a corresponding application, in a desktop environment rendered in memory of a computer;
            querying each corresponding application of the icons and capturing through the querying, attributes for each application;
            creating a workspace profile and writing to the workspace profile a reference for each application corresponding to a selected one of the application icons and corresponding ones of the captured attributes; and
            generating a single activatable workspace object from the workspace profile for all of the selected multiplicity of application icons; and,
        upon activation of the single activatable workspace object, loading each of the applications in the workspace profile using for each of the applications, the corresponding ones of the captured attributes referenced in the workspace profile and modifying the workspace profile to reflect changes to the captured attributes.

6. A computer program product comprising a non-transitory computer readable storage medium embodying computer readable program code for creating and managing user interface desktop workspaces, the computer readable program code, when executed by a computer, causes the computer to perform the steps comprising:
    creating a plurality of user interface desktop workspaces, each user interface desktop workspace being created by
        selecting a multiplicity of application icons each of the icons referring to a corresponding application, in a desktop environment rendered in memory of a computer;
        querying each corresponding application of the icons and capturing through the querying, attributes for each application;
        creating a workspace profile and writing to the workspace profile a reference for each application corresponding to a selected one of the application icons and corresponding ones of the captured attributes; and
        generating a single activatable workspace object from the workspace profile for all of the selected multiplicity of application icons; and,
    upon activation of the single activatable workspace object, loading each of the applications in the workspace profile using for each of the applications, the corresponding ones of the captured attributes referenced in the workspace profile and modifying the workspace profile to reflect changes to the captured attributes.

7. The computer program product of claim 6, further comprising:
    hiding each of the applications in the desktop environment responsive to a directive to hide the workspace object in the desktop environment.

8. The computer program product of claim 6, further comprising:
    closing each of the applications in the desktop environment responsive to a directive to close the workspace object in the desktop environment.

9. The computer program product of claim 8, further comprising:
    updating the workspace profile with changes to the attributes responsive to the directive to close the workspace object in the desktop environment.

* * * * *